(12) United States Patent
Attig

(10) Patent No.: US 9,751,386 B1
(45) Date of Patent: Sep. 5, 2017

(54) VEHICLE SCREEN FOR SIDE WINDOW ASSEMBLY

(71) Applicant: Wanda Attig, Albert Lea, MN (US)

(72) Inventor: Wanda Attig, Albert Lea, MN (US)

( * ) Notice: Subject to any disclaimer, the term of this patent is extended or adjusted under 35 U.S.C. 154(b) by 179 days.

(21) Appl. No.: 14/466,101

(22) Filed: Aug. 22, 2014

Related U.S. Application Data

(60) Provisional application No. 61/868,819, filed on Aug. 22, 2013.

(51) Int. Cl.
  *B60J 3/02* (2006.01)
  *E06B 9/68* (2006.01)
  *B60J 1/20* (2006.01)

(52) U.S. Cl.
  CPC ............... *B60J 3/0234* (2013.01); *E06B 9/68* (2013.01); *B60J 1/2002* (2013.01)

(58) Field of Classification Search
  CPC . B60J 5/065; B60J 5/067; B60J 3/0204; B60J 1/20; B60J 1/2002; B60J 1/2011
  USPC .............. 160/370.22; 296/146.15; 49/61–63; 74/89.23, 89.17, 89.18, 422, 424.6
  See application file for complete search history.

(56) References Cited

U.S. PATENT DOCUMENTS

| | | | |
|---|---|---|---|
| 2,710,058 A * | 6/1955 | Gronlund | B60J 1/2011 160/103 |
| 2,717,036 A | 9/1955 | Harris | |
| 3,753,458 A | 8/1973 | Lazarek | |
| 4,100,957 A | 7/1978 | Shelton | |
| 4,331,359 A * | 5/1982 | Sheldon | B60J 1/17 296/146.2 |
| 4,936,368 A | 6/1990 | Philbeck et al. | |
| 5,012,613 A * | 5/1991 | Sekine | B60J 1/17 49/349 |
| 5,165,188 A * | 11/1992 | Tsiros | B60J 3/02 296/146.2 |
| 5,423,589 A | 6/1995 | Pank | |
| 5,984,405 A | 11/1999 | Ciacci | |
| 6,367,536 B1 | 4/2002 | St. Louis | |
| 6,523,880 B1 * | 2/2003 | Yako | B60J 1/2011 296/152 |
| 6,655,092 B2 * | 12/2003 | Pacella | B60J 5/0402 49/349 |
| 7,137,428 B1 * | 11/2006 | Alford | B60J 1/2011 160/105 |
| 2007/0029055 A1 * | 2/2007 | Joseph | B60J 1/2011 160/105 |

(Continued)

FOREIGN PATENT DOCUMENTS

EP 0265891 A2 5/1988

*Primary Examiner* — Blair M Johnson
*Assistant Examiner* — Jeremy Ramsey
(74) *Attorney, Agent, or Firm* — Robert C. Montgomery; Montgomery Patent and Design, LP.

(57) ABSTRACT

A vehicle door screen for a side window assembly includes a track system incorporating a glass window track and a screen track. The system is provided with electrical motorized actuators to enable a user to operate the track system from inside the vehicle. The window track is provided with a glass windowpane to complement the profile of the side door window opening. The screen track is provided with a frame to complement the profile of the side door window opening. The screen material is made of a ventilating mesh material. The window and screen tracks may be operated concurrently or independently by a user, as desired.

18 Claims, 9 Drawing Sheets

(56) References Cited

U.S. PATENT DOCUMENTS

2007/0145775 A1* 6/2007 Smith .................... B60J 1/2011
296/146.15

* cited by examiner

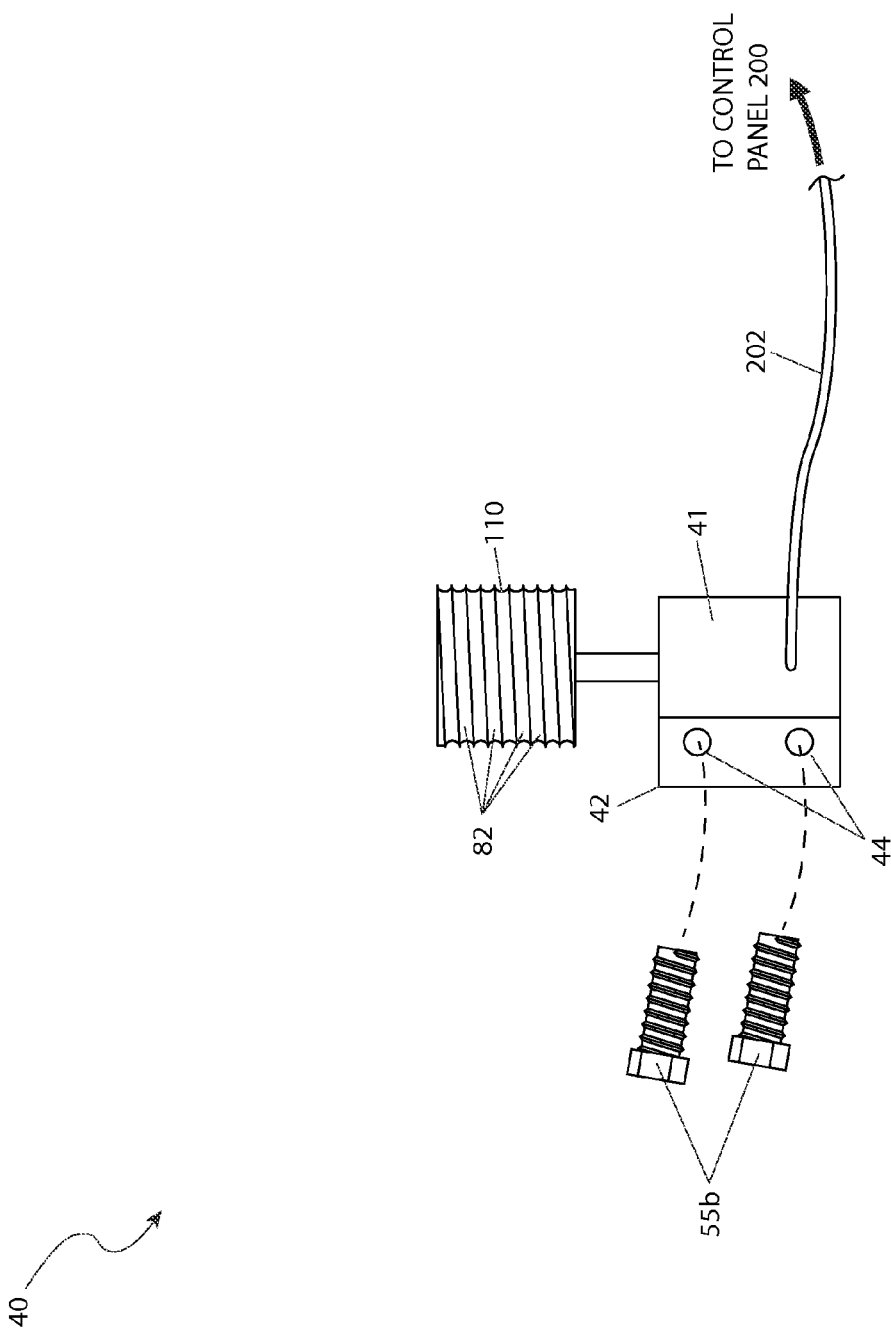

VEHICLE SCREEN FOR SIDE WINDOW ASSEMBLY

RELATED APPLICATIONS

The present invention was first described in and claims the benefit of U.S. Provisional Application No. 61/868,819, filed on Aug. 22, 2013, the entire disclosures of which are incorporated herein by reference.

FIELD OF THE INVENTION

The presently disclosed subject matter is directed to vehicle windows. More particularly it is directed to a dual tracked vehicle side door window and screen assembly.

BACKGROUND OF THE INVENTION

Anyone who has ever entered a sealed car parked outside on a hot sunny day can attest that the passenger compartment interior can get very hot.

Usual methods of cooling hot passenger compartment interiors include opening all windows to assist heat removal, placing blinds on the windshield, and running the air conditioning. Those methods all suffer from some form of drawback. Opening all windows and then cooling the passenger compartment interior takes time. Windshield blinds only affects sunlight directly entering through the windshield and they can be difficult to use. Air conditioning requires time to successfully cool the passenger compartment interior, involves time, additional wear and tear on the engine to power an air compressor, and the energy to operate the air conditioner costs money.

Accordingly, there is a need for a system by which the passenger compartment of a vehicle can be prevented from accumulating heat on a hot day.

SUMMARY OF THE INVENTION

The principles of the present invention provide for a system by which the passenger compartment of a motor vehicle can be prevented from accumulating heat on a hot day.

A system in accord with the present invention takes the form of a side window assembly comprising a first track having a first framework with a first "U"-shaped retention channel retaining a windowpane and which is configured to fit into a door panel. The side window assembly further includes a first grooved channel having a first body with first grooves and a first flange that is attached to the first framework; a first electro-mechanical actuator having a first bracket and a first electric motor with an attached first worm gear engaged with the first grooves; a second track having a second framework with a second "U"-shaped retention channel retaining a screen and which is configured to fit into the door panel; a second grooved channel having a second body with second grooves and a second flange that is attached to the second framework; and a second electro-mechanical actuator having a second bracket and a second electric motor with an attached second worm gear that is engaged with the second grooves. The first bracket is for attaching the first electro-mechanical actuator to the interior of a door panel, the second bracket is for attaching the second electro-mechanical actuator to the interior of a door panel. When the first electric motor rotates the first worm gear applies a force on the first grooves which moves the first track and when the second electric motor rotates the second worm gear applies a force on the second grooves which moves the second track.

In practice, the first grooves complement the first worm gear and the first framework is configured to complement a door panel profile so as to fit into a window opening. Beneficially the first framework has a first aperture, the first grooved channel has a matching second aperture, and the first framework is attached to the first grooved channel by a first threaded fastener. Preferably the side window assembly will also include a wheeled-rail assembly having a rail with at least one (1) spring loaded wheel that is biased into contacting the first framework. That rail should include a rail bracket that is configured to be affixed to the interior of the door panel such that the first framework is guided by the at least one spring loaded wheel. The wheeled-rail assembly may also include at second rail having a second rail bracket that is configured to be affixed to the interior of the door panel and a second spring loaded wheel for guiding the second framework.

The side window assembly may also include a control panel that is in electrical communication with the first electric motor and with the second electric motor and which is further for being in electrical communication with electrical power of a vehicle. The control panel would then include a first switching assembly to activate the first electric motor in a first direction and in a second direction. That switching assembly may include at least one (1) three-position switch. When the first electric motor is activated in the first direction the first worm gear raises the first track and when the first electric motor is activated in the second direction the first worm gear lowers the first track.

The control panel beneficially includes a microprocessor for controlling the application of electric power to the first electric motor. The control panel may also include a second switching assembly that activates the second electric motor in the first direction and in the second direction. In practice the control panel can activate the first electric motor and the second electric motor in different directions.

Another system in accord with the present invention takes the form of a vehicle having a vehicle battery and a door panel with an interior, a window opening, and an arm rest. The vehicle further includes a first track having a first framework with a first "U"-shaped retention channel retaining a windowpane; a first grooved channel having a first body with first grooves and a first flange attached to the first framework; a first electro-mechanical actuator having a first bracket and a first electric motor with an attached first worm gear engaged with the first grooves, the first electro-mechanical actuator being attached to the interior by the first bracket; a second track having a second framework with a second "U"-shaped retention channel retaining a screen; a second grooved channel having a second body with second grooves and a second flange attached to the second framework; and a second electro-mechanical actuator having a second bracket and a second electric motor with an attached second worm gear engaged with the second grooves, the second electro-mechanical actuator being attached to the interior by the second bracket. When the first electric motor rotates the first worm gear applies a force on the first grooves which moves the first track within the window opening; and when the second electric motor rotates the second worm gear applies a force on the second grooves which moves the second track within the window opening.

The vehicle windowpane is preferably configured to complement the door panel and to fit into a window opening. Beneficially the first framework has a first aperture, the first grooved channel has a matching second aperture, and the first framework is attached to the first grooved channel by a first threaded fastener. The vehicle may also include a wheeled-rail assembly having a rail with at least one (1) spring loaded wheel. That rail being attached to the door panel such that the at least one (1) spring loaded wheel is biased into contacting with the first framework. The vehicle beneficially further includes a control panel in the arm rest with the control panel being in electrical communication with the first electric motor, with the second electric motor, and the vehicle battery. That control panel includes a first switching assembly to activate the first electric motor in a first direction and in a second direction and a second switching assembly to activate the second electric motor in the first direction and in the second direction. Preferably the control panel can activate the first electric motor and the second electric motor in different directions.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5 is a front view of an electro-mechanical actuator 40, according to a preferred embodiment of the present invention;

Figure 1:
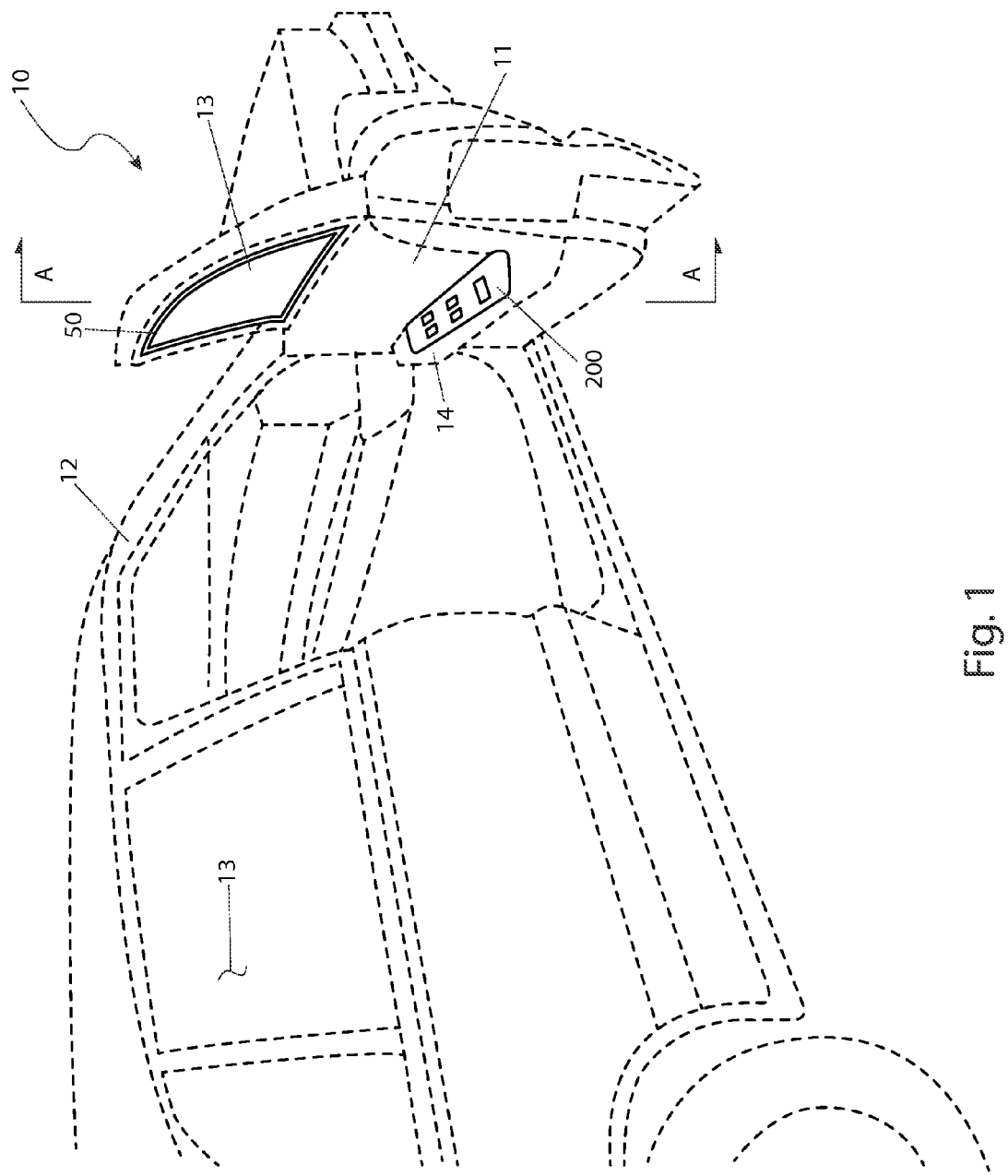
FIG. 1 is a perspective view of a vehicle screen window system 10 depicting installation within a vehicle 12, according to a preferred embodiment of the present invention.

DESCRIPTIVE KEY 10 vehicle screen window system
11 door panel
12 vehicle
13 side door window opening
14 arm rest
20 first track
30 second track
40 electro-mechanical actuator
41 motor
42 first bracket
44 first bracket aperture
50 framework
55a first fastener
55b second fastener
55c third fastener
60 retention channel
70 channel opening
80 grooved channel
82 groove
90 flange
100 flange aperture
110 worm gear
120 windowpane
130 screen panel
140 wheeled-rail assembly
150 frame aperture
160 rail
162 second bracket
164 second bracket aperture
170 latitudinal side
180 longitudinal side
190 wheel
192 axle
200 control panel
202 wiring
204 switch
206 control module

DETAILED DESCRIPTION OF THE PREFERRED EMBODIMENT

The best mode for carrying out the invention is presented in terms of its preferred embodiment, herein depicted within FIGS. 1 through 9. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 2:
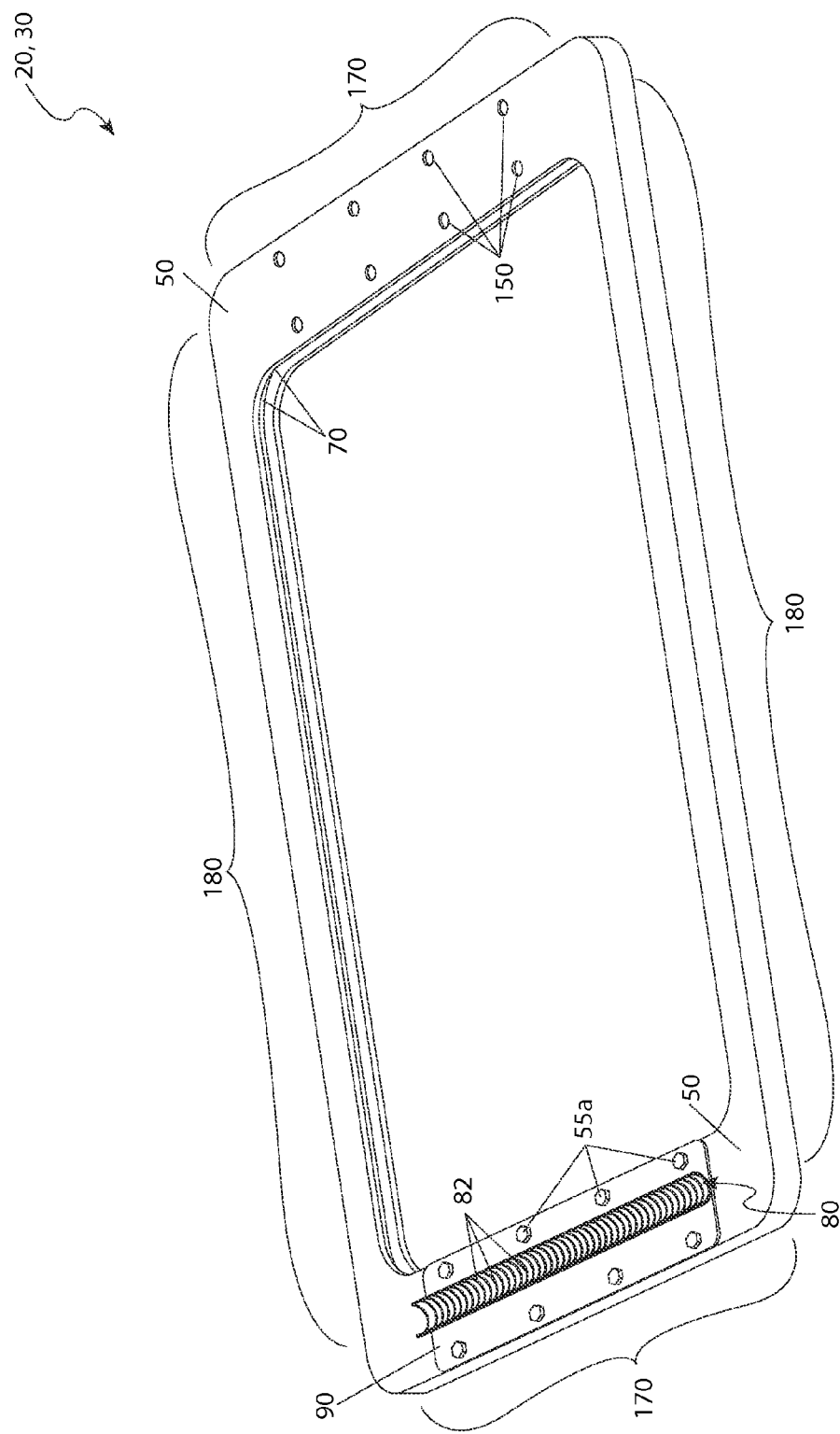
FIG. 2 is a front view of track portions 20, 30, according to a preferred embodiment of the present invention.

FIG. 1 presents a perspective view of vehicle screen window system 10 that is in accord with the present invention integrated into a door panel 11 of a vehicle 12. FIG. 2 presents a front view of a track 20 or a track 30 (they are identical) of the vehicle screen window system 10. Referring primarily to those figures, as well as to FIGS. 5 and 6 as required, the vehicle screen window system 10 includes the first track 20 which incorporates a windowpane 120 and the second track 30 which incorporates a screen 130. The tracks 20, 30 are independently operable.

It should be understood that while the vehicle screen window system 10 is shown integrated into a door panel 11 that it can be retrofit into an existing door panel 11. It should also be understood that although a single vehicle screen window system 10 is illustrated and described herein, it is envisioned that additional units of the vehicle screen window system 10 may be installed in other door panels 11 of the vehicle 12.

The system 10 comprises a first track 20 and a second track 30 (see FIG. 2) which are manipulated via a plurality of electro-mechanical actuators 40 (see FIG. 5), and operated via a control panel 200 envisioned to be integrated into an armrest portion 14 of the vehicle 12. The system 10 is a unit that is integrated into an interior of a door panel 11 of a vehicle 12 (see FIG. 8).

Figure 3:
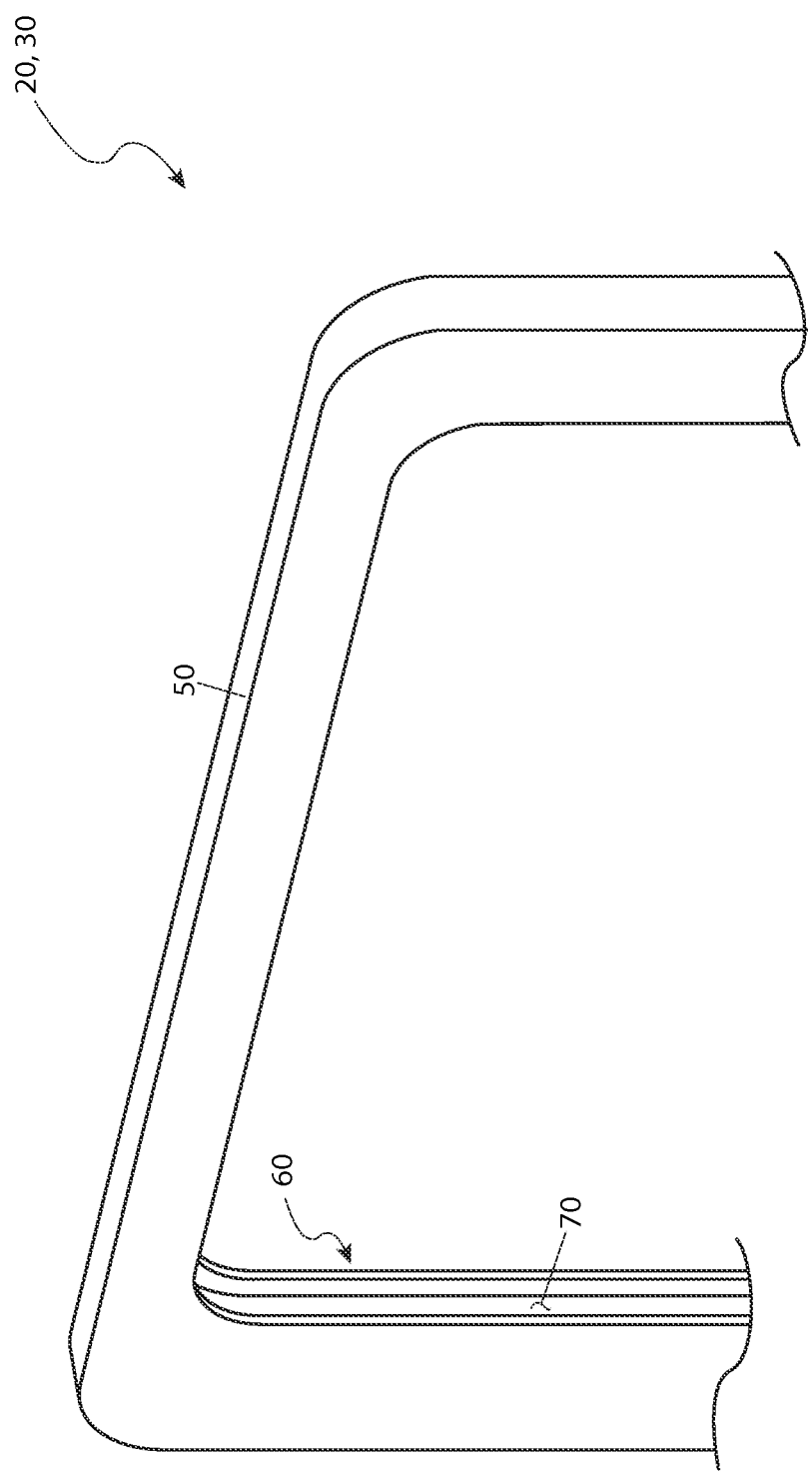
FIG. 3 is a perspective view of track portions 20, 30, according to a preferred embodiment of the present invention.
Figure 4:
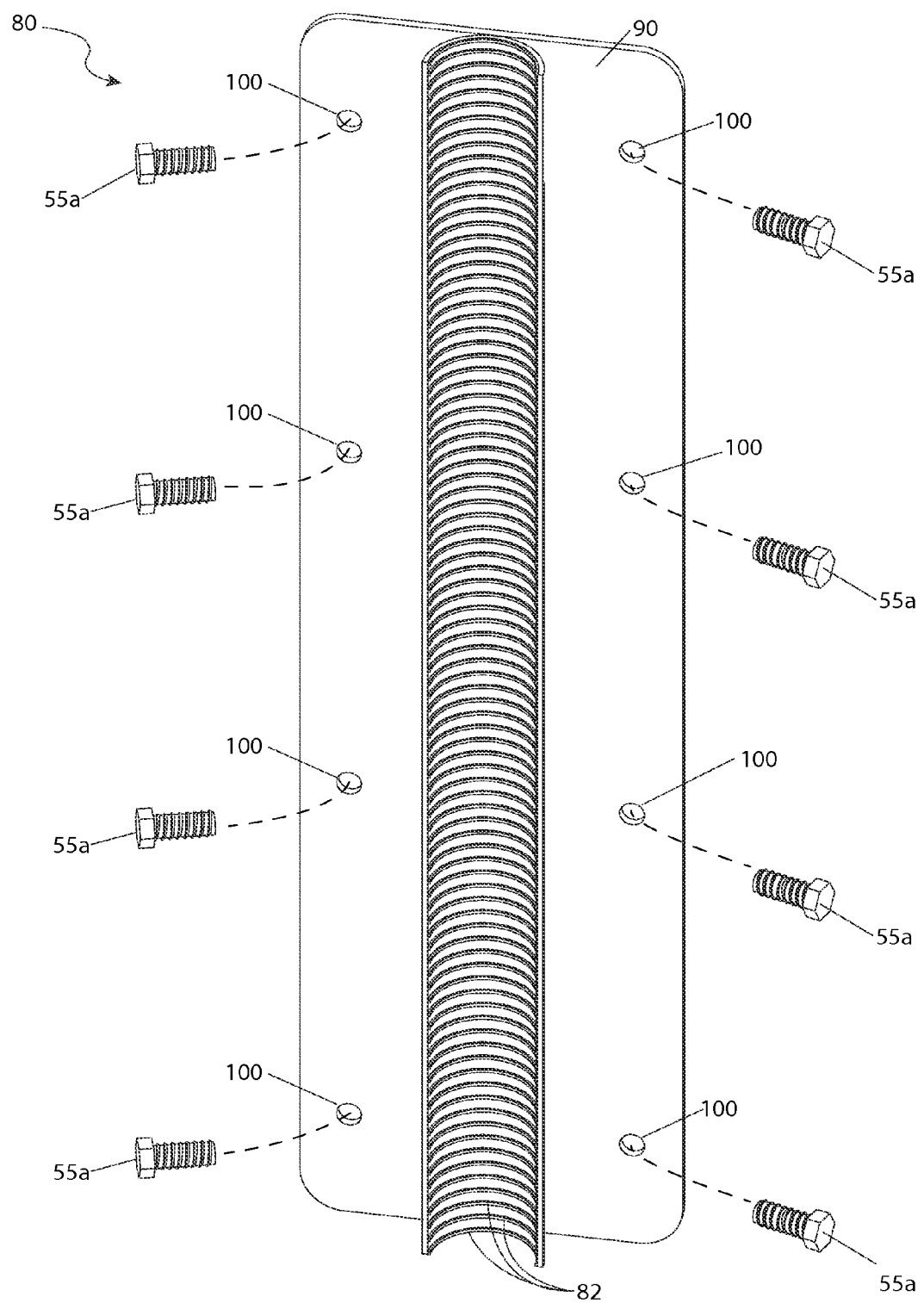
FIG. 4 is a perspective view of a grooved channel 80, according to a preferred embodiment of the present invention.

Referring now to FIGS. 2, 3, and 4, a front view of the track portions 20, 30, a perspective view of the track portions 20, 30, and a perspective view of a grooved channel 80, according to a preferred embodiment of the present invention, are disclosed. Each track 20, 30 comprises a respective framework 50 complimenting a profile of a side door window opening 13 of a vehicle 12 (see FIG. 1), and is fabricated from a rigid material such as a steel alloy, aluminum, or plastic. Each framework 50 comprises a U-shaped retention channel 60 that forms a continuous structure, where the channel opening 70 faces an inner direction throughout the framework 50 construction. Each track 20, 30 includes an integral pair of latitudinal sides 170 and an integral pair of longitudinal sides 180. Attached to each framework 50 is a plurality of grooved channels 80 that extend perpendicularly from outwardly-facing surfaces of the latitudinal side portions 170 along opposing side edges of each framework 50. One (1) of the latitudinal side portions 170 is shown here with the grooved channel 80 removed for illustration sake. Each grooved channel 80 is provided with mounting flanges 90, having a plurality of flange apertures 100. Each framework 50 is provided with a plurality of mating frame apertures 150. The frame apertures 150 are envisioned to be threaded and aligned with the flange apertures 100 of each grooved channel 80. The apertures 100, 150 enable a user to attach each grooved channel 80 so as to position each grooved channel 80 relative to the framework 50, thereby granting a means to adjust the relative position to adapt to compromising spatial constraints when the system 10 is employed in a door panel 11 (see FIG. 1). It is envisioned for each grooved channel 80 to be attached to the framework 50 using first fasteners 55a, such as threaded bolts, being inserted through the flange apertures 100 and threaded into the frame apertures 150.

Figure 8:
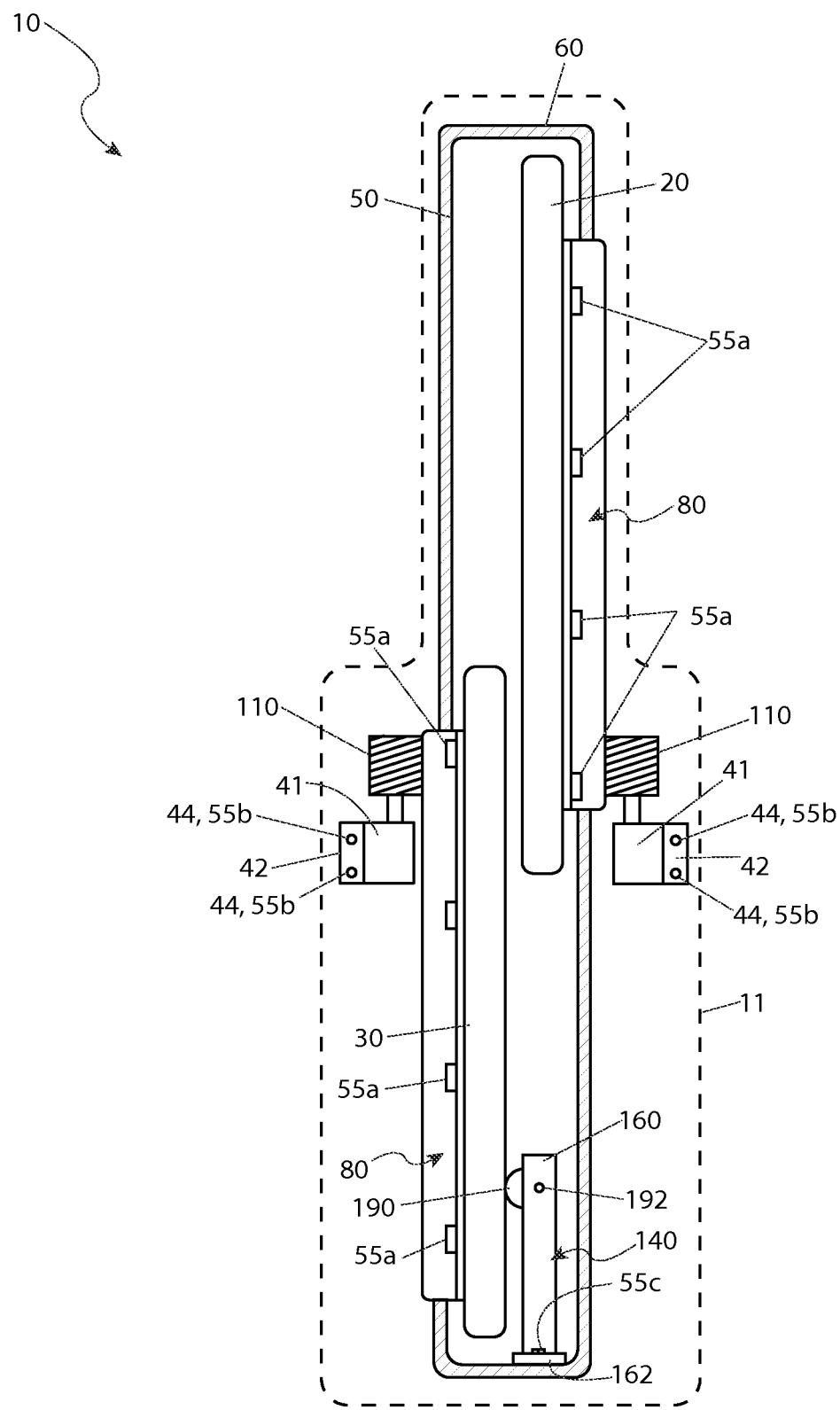
FIG. 8 is a sectional view of the perspective view of the vehicle screen window system 10 taken along section line A-A (see FIG. 1), according to a preferred embodiment of the present invention; and, FIG. 9 is an electrical block diagram of the vehicle screen window system 10, according to a preferred embodiment of the present invention.

Each grooved channel 80 engages a worm gear portion 110 of an electro-mechanical actuator 40 including a motor 41, so that when each of the motors 41 rotate, the corresponding worm gear 110 forces the respective grooved channel 80 with which it is engaged to be motioned upwardly or downwardly coincidentally with the attached framework 50 (see FIG. 8). The framework 50 of each track portion 20, 30 is placed within an interior of a door panel 11 of a vehicle 12 (see FIG. 1) so that when a particular set of electro-mechanical actuators 40 and engaged grooved channels 80 is actuated, that framework 50 traverses the side door window opening 13 in either a rising motion or a lowering motion (see FIG. 1).

Figure 6B:
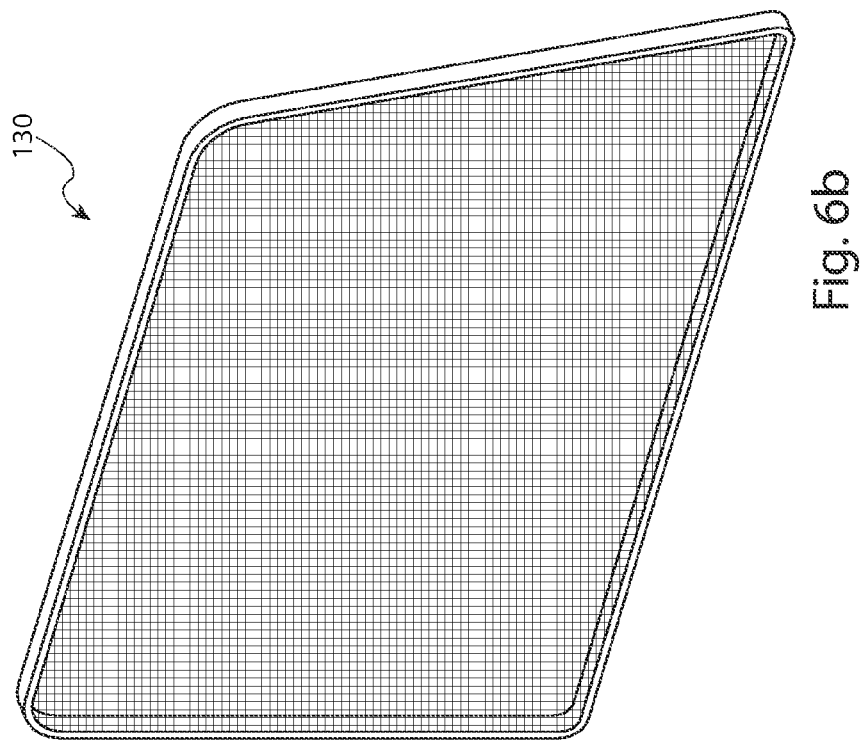
FIG. 6b is a perspective view of a screen panel 130, according to a preferred embodiment of the present invention.
Figure 6A:
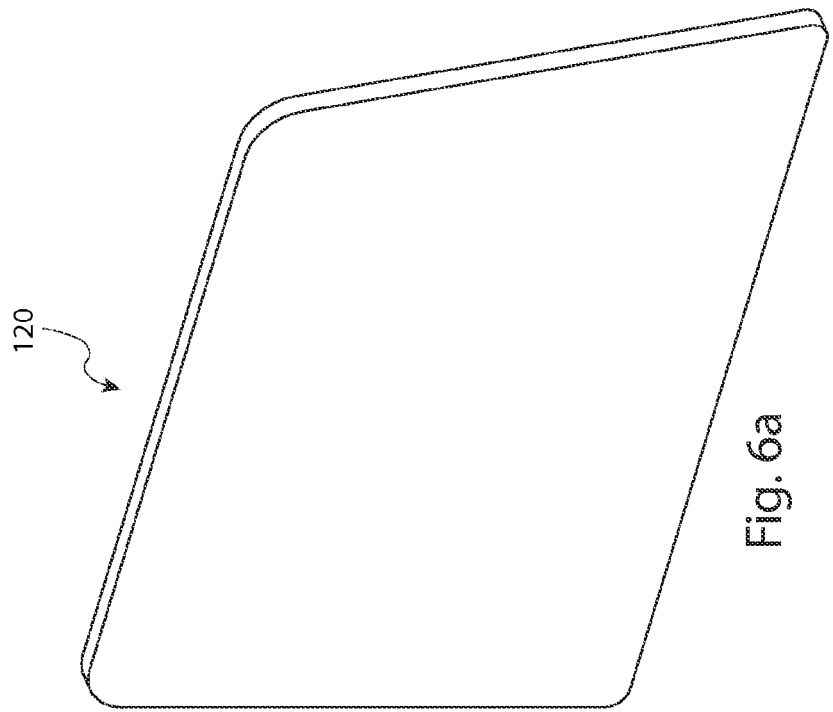
FIG. 6a is a perspective view of a windowpane 120, according to a preferred embodiment of the present invention.

Referring now to FIGS. 6a and 6b, perspective views of windowpane 120 and screen panel 130 portions of the system 10, according to a preferred embodiment of the present invention, are disclosed. The first track 20 is described as being most proximate to the interior of the vehicle 12, whereas the second track 30 is most proximate to an exterior of the vehicle 12 (see FIGS. 1 and 2); however, it is understood that the designation of the relative juxtaposition is for convenience of illustration. Both tracks 20, 30 are identical in construction and the system 10 may be also configured with the position of the tracks 20, 30 reversed (also see FIG. 2).

The first track 20 envelops a perimeter edge of a windowpane 120. The windowpane 120 is preferably fabricated from a glass; however, other materials exhibiting rigidity and translucence may be used. In a similar manner, the second track 30 envelops a perimeter edge of a screen panel 130. The screen panel 130 preferably comprises a woven synthetic fiber such as KEVLAR®, fiberglass, or other ventilating material exhibiting a toughness and strength to resist cutting, tearing, puncturing, and abrasion. The screen panel 130 has a solid rigid member for its perimeter edge and an open mesh for its center. The perimeter edge of the windowpane 120 slidably inserts into the retention channel portion 60 of the first track 20 (see FIG. 3). The perimeter edge of the screen panel 130 slidably inserts into the retention channel 60 of the framework 50 of the second track 30 (see FIG. 3). The channel opening 70 of each track 20, 30 is preferably lined with a rubber or silicon member to act as a weather stripping and a seal for the space between a surface of the channel opening 70 and the windowpane 120 or screen panel 130.

Figure 7:
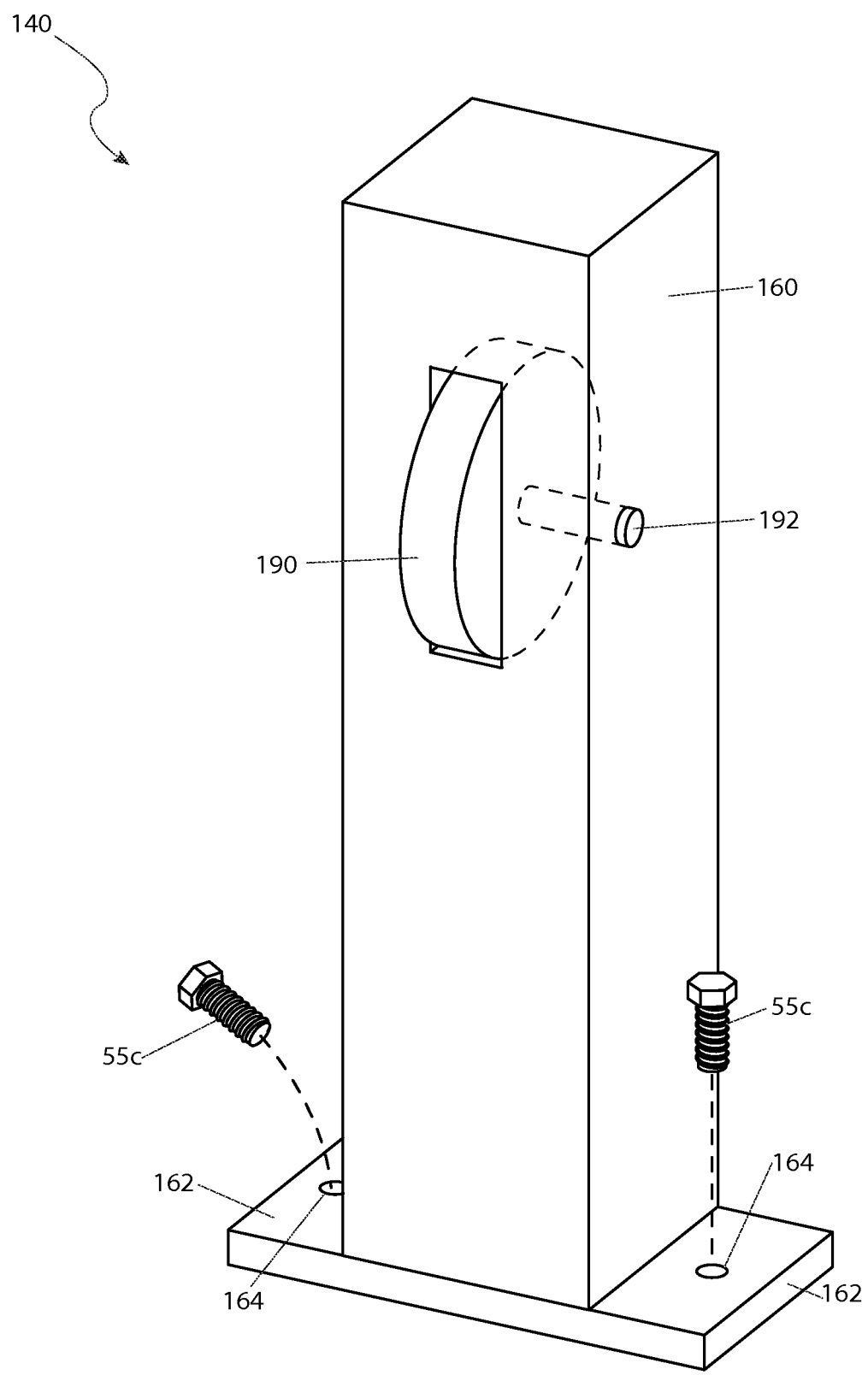
FIG. 7 is a perspective view of a wheeled-rail assembly 140, according to a preferred embodiment of the present invention.

Referring now to FIGS. 4, 5, and 7, a perspective view of a grooved channel 80, a front view of an electro-mechanical actuator 40, and a perspective view of a wheeled-rail assembly 140, according to a preferred embodiment of the present invention, are disclosed. The first track 20 and second track 30 are provided with a pair of grooved channels 80 affixed to the latitudinal side portions 170 (see FIG. 2). The grooved channels 80 of the first track 20 and second track 30 portions engage separate worm gears 110 and electro-mechanical actuators 40 so that each track 20, 30 can be operated concurrently or independently of the other. Each electro-mechanical actuator 40 is mounted to an interior portion of the door panel 11 via integral first bracket portions 42 of a motor portion 41 using corresponding second fasteners 55b each routed through a first bracket aperture 44. Each grooved channel 80 is configured to complement the configuration of each worm gear 110 with which it is engaged so that when the worm gear 110 rotates, the groove portions 82 of the grooved channel 80 impose a force upon engaged groove portions 82 of the worm gear 110.

Each track 20, 30 is guided in a parallel manner with respect to an interior portion of the door panel 11 by respective wheeled-rail assemblies 140, each of which include a support rail 160 having a compliant wheel 190 being rotatingly affixed thereto via an axle portion 192. Each rail 160 is affixed to the interior of the door panel 11 via integral second bracket portions 162 having second bracket apertures 164 and using corresponding third fasteners 55c. Each wheel 190 is to provide a compliant contact against the first latitudinal sides 170, being made of a soft rubber or other compliant mounting means to the rail 160, being positioned along side surfaces of the latitudinal sides 170 of each track 20, 30. The first latitudinal sides 170 of the tracks 20, 30 are positioned at opposing sides of the tracks 20, 30. The first latitudinal sides 170 are guided by the wheels 190, whereas an edge of the second track 30 is positioned between additional wheel portions 190. It is envisioned that additional wheeled-rail assemblies 140 may be positioned at intermediate locations along each rail 20, 30 to place tension upon each of the tracks 20, 30 as they are motioned vertically. The configuration of each wheel 190 is biased in a forward direction. As each track 20, 30 traverses the side door window opening 13, the portion of the track 20, 30 that is within the door panel 11 is guided by the wheeled-rail assemblies 140, thereby maintaining each track 20, 30 in a secure position. As each track 20, 30 extends from the door panel 11, it slidably inserts into ancillary guide portions of the vehicle's door panel 11 (see also FIG. 8).

Referring now to FIGS. 1 and 5, a perspective view of the system 10 installed into a vehicle 12, and a front view of an electro-mechanical actuator 40, are disclosed. Each electro-mechanical actuator 40 comprises an electric motor 41 having a protruding worm gear 110 which acts to communicate a torque to the complimenting grooved channel 80. Each electro-mechanical actuator 40 is affixed to interior portions of the door panel 11 via first bracket 42 and second fasteners 55b.

Each electro-mechanical actuator 40 is further placed into electrical communication with a control panel 200 located upon the vehicle's 12 door panel 11, and with the 12-volt system of the vehicle 12 via interconnecting wiring 202. The control panel 200 includes switches 204 preferably of a toggle-style-type electrical switch that sends an electrical signal to engage each electro-mechanical actuator 40 in a first direction, a second direction, or a neutral direction. When the electro-mechanical actuators 40 of a selected track 20, 30 are activated in a first direction, the respective electro-mechanical actuators 40 rotate respective worm gear portions 110 to force the track 20, 30 to traverse the side door window opening 13 in a rising motion. When activated in a second direction, the electro-mechanical actuators 40 rotate the worm gears 110 in an opposite direction to force a track 20, 30 to traverse the side door window opening 13 in a lowering motion. When activated in a neutral direction, the electro-mechanical actuators 40 do not rotate the worm gears 110, and the track 20, 30 maintains its current position. It is further envisioned that each electro-mechanical actuator 40 and/or control panel 200 include mechanical or electronic means to prevent over-extension of each track 20, 30 in either direction.

Referring now to FIG. 8, a sectional view of the system 10 taken along section line A-A (see FIG. 1), according to a preferred embodiment of the present invention, is disclosed. The system 10 is a unit that is integrated into an interior of a door panel 11 of a vehicle 12 so that the design of the door panel 11 incorporates the system 10; however, it is understood that a skilled artisan may reconfigure an existing door panel 11 to facilitate a retrofitting of the system 10 into an existing vehicle 12 as well. The tracks 20, 30 and included window pane 120 and screen panel 130 portions, may be raised or lowered within the framework 50 either concurrently or independently based upon a user's preference. The tracks 20, 30 are shown here with the first track 20 in a lowered state within the door panel 11, and the second track 30 illustrated in a raised position.

Figure 9:
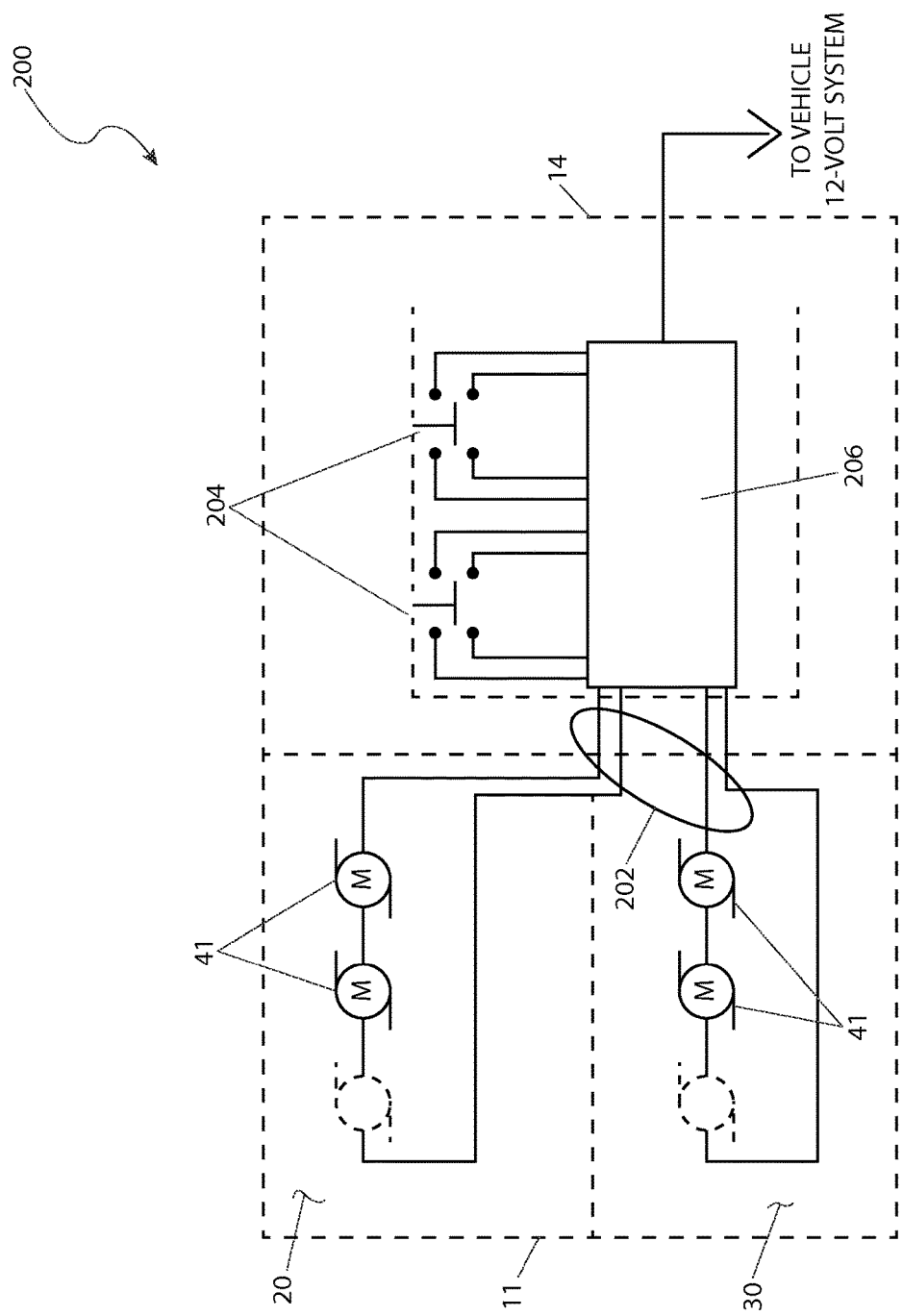

Referring now to FIG. 9, an electrical block diagram of the system 10, according to a preferred embodiment of the present invention, is disclosed. The system 10 is operated by a user via interface with a control panel 200 located upon an arm rest portion 14 of the vehicle 12. The control panel 200 is envisioned to be integrated into the arm rest portion 14 of the vehicle 12 in combination with other conventional switches and control portions utilized by other sub-systems of the vehicle 12. The control panel 200 includes interconnecting wiring 202, a plurality of three-position switches 204, and a microprocessor-based control module 206.

The control module 206 preferably provides microprocessor-based operation of the system 10 being capable of processing input signals from the switches 204 and providing output power to the motors 41 in accordance with embedded software instructions; however, it is understood that a conventional hard-wired configuration of the control panel 200 may be used with equal benefit, and as such should not be interpreted as a limiting factor of the system 10. The control module 206 provides a circuit board construction including components such as, but not limited to: microprocessors, relays, embedded software, and memory chips. The control module 206 receives electrical power from the vehicle's 12-volt system via common wiring 202 which is used to power a pair of spring-centered single-pole, double throw toggle switches 204 which energize the motors 41 to in turn motion of the tracks 20, 30 in an independent manner in up and down directions. The switches 204 are envisioned to perform a similar function as a conventional automotive power window control switch. The switches 204 provide signals to the control module 206 which in turn powers the motor portions 41 of the electro-mechanical actuators 40 via respective relay-type components. Connection of the control module 206 to the vehicle's power source, switches 204, and motors 41 is accomplished via common copper conductor wiring 202. It is envisioned that the system 10 may be installed in at least one (1) door panel portion 11 of the vehicle 12, and that additional units of the system 10 and respective control panels 200 may be installed in other door panel portions 11 of the vehicle 12 in like manner.

The preferred embodiment of the present invention can be utilized by the common user in a simple and effortless manner with little or no training. The system 10 is preferably integrated as a unit into an interior of a door panel 11 of a vehicle 12 so that the design of the door panel 11 incorporates the system 10 as indicated in FIG. 1; however, it is understood that a skilled artisan may reconfigure a door panel portion 11 of an existing vehicle 12 to facilitate a retrofitting of the system 10 as well.

The method of utilizing the system 10 may be achieved by performing the following steps: acquiring a vehicle 12 equipped with at least one (1) unit of the system 10; pressing the switch portions 204 of the control panel 200 in a similar manner as a conventional automotive power window control switch to motion each track 20, 30; allowing the tracks 20, 30 to traverse a side door window opening 13 of the vehicle 12 concurrently or independently; and, benefiting from additional ventilating capabilities, afforded a user of the present invention 10.

The method of retrofitting the system 10 within an existing vehicle 12 may be achieved by performing the following steps: installing a windowpane 120 in a first track 20 and a screen panel 130 in a second track 30; installing a set of grooved channels 80 onto each framework 50 of each track 20, 30 using the first 55a and second 55b fasteners; mounting electro-mechanical actuators 40 to an interior of a door panel 11 using the first brackets 42 and second fasteners 55b; installing the tracks 20, 30 into the door panel 11; adjusting a position of the electro-mechanical actuators 40 to ensure that the worm gear portion 110 of each mechanical actuator 40 engages the respective grooved channel 80; affixing a plurality of wheeled-rail assemblies 140 to an interior of a door panel 11 using the second brackets 162 and corresponding third fasteners 55c; positioning the tracks 20, 30 within the wheeled-rail assemblies 140; adjusting a position of the wheeled-rail assemblies 140 to ensure proper contact of the wheeled-rail assemblies 140 with the latitudinal sides 170 of the tracks 20, 30; installing the control panel 200 into an armrest portion 14 of the vehicle 12; connecting the control module portion 206 of the control panel 200 to the vehicle's 12-volt system using wiring 202; connecting the control module portion 206 to the electro-mechanical actuators 40; manipulating each track 20, 30 concurrently or independently by pressing the switches 204 to activate the electro-mechanical actuators 40; and, utilizing the system 10 to motion each track 20, 30 to traverse a side door window opening 13, as desired.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A side window assembly, comprising:
a first track having a first framework comprised of two latitudinal and two longitudinal sides that form first outside side edges, a first outwardly facing surface, a second outwardly facing surface and an inner first U-shaped retention channel retaining a windowpane, said first framework configured to fit into a door panel;
an open-faced first grooved channel having semi-circular first grooves and a first flange attached to said first outwardly facing surface of said first framework;
a first electro-mechanical actuator having a first bracket and a first electric motor with an attached first worm gear engaged with said first grooves;
a first wheeled-rail assembly having a first rail with at least one spring loaded first wheel biased into contact with said second outwardly facing surface of said first framework to maintain engagement of said first grooves with said first worm gear;
a second track having a second framework comprised of two latitudinal and two longitudinal sides that form second outside side edges, a third outwardly facing surface, a fourth outwardly facing surface and an inner second U-shaped retention channel retaining a screen, said second framework configured to fit into the door panel;
an open-faced second grooved channel having semi-circular second grooves and a second flange attached to said third outwardly facing surface of said second track;
a second electro-mechanical actuator having a second bracket and a second electric motor with an attached second worm gear engaged with said second grooves; and,
a second wheeled-rail assembly having a second rail with at least one spring loaded second wheel biased into contact with said fourth outwardly facing surface of said second framework to maintain engagement of said second grooves with said second worm gear;
wherein said first bracket is for attaching said first electro-mechanical actuator to the interior of a door panel;
wherein said second bracket is for attaching said second electro-mechanical actuator to the interior of the door panel;
wherein, when said first electric motor rotates, said first worm gear applies a force on said first grooves which moves said first track and,
wherein, when said second electric motor rotates, said second worm gear applies a force on said second grooves which moves said second track.

2. The side window assembly according to claim 1, wherein said first grooves complement said first worm gear.

3. The side window assembly according to claim 1, wherein said first framework is configured to complement a door panel profile and to fit into a window opening.

4. The side window assembly according to claim 1, wherein said first framework has a first aperture that passes from said first outwardly facing surface to said second outwardly facing surface, wherein said first grooved channel has a matching second aperture, and wherein said first framework is attached to said first grooved channel by a first threaded fastener.

5. The side window assembly according to claim 1, wherein said first rail includes a first rail bracket configured to be affixed to the interior of the door panel such that said first framework is guided by said at least one spring loaded first wheel.

6. The side window assembly according to claim 5, wherein said second rail includes a second rail bracket configured to be affixed to the interior of the door panel such that said second framework is guided by said at least one spring loaded second wheel.

7. The side window assembly according to claim 1, further including a control panel in electrical communication with said first electric motor and with said second electric motor, said control panel further for being in electrical communication with electrical power of a vehicle, wherein said control panel comprises a first switching assembly to activate said first electric motor in a first direction and in a second direction.

8. The side window assembly according to claim 7, wherein said switching assembly includes at least one three-position switch.

9. The side window assembly according to claim 8, wherein when said first electric motor is activated in said first direction said first worm gear raises said first track.

10. The side window assembly according to claim 9, wherein when said first electric motor is activated in said second direction said first worm gear lowers said first track.

11. The side window assembly according to claim 10, wherein said control panel includes a microprocessor for controlling the application of electric power to said first electric motor.

12. The side window assembly according to claim 11, wherein said control panel comprises a second switching assembly for activating said second electric motor in the first direction and in the second direction.

13. The side window assembly according to claim 12, wherein said control panel can activate said first electric motor and said second electric motor in different directions.

14. A vehicle, comprising:
a door panel having an interior, a window opening, and an arm rest;
a vehicle battery;
a first track having a first framework comprised of two latitudinal and two longitudinal sides that form first outside side edges, a first outwardly facing surface, a second outwardly facing surface and an inner first U-shaped retention channel retaining a windowpane;
an open-faced first grooved channel having semi-circular first grooves and a first flange attached to said first outwardly facing surface of said first framework;
a first electro-mechanical actuator having a first bracket and a first electric motor with an attached first worm gear engaged with said first grooves, said first electro-mechanical actuator attached to said interior by said first bracket;
a first wheeled-rail assembly having a first rail with at least one spring loaded first wheel biased into contact with said second outwardly facing surface of said first framework to maintain engagement of said first grooves with said first worm gear;
a second track having a second framework comprised of two latitudinal and two longitudinal sides that form second outside side edges, a third outwardly facing surface, a fourth outwardly facing surface and an inner second U-shaped retention channel retaining a screen;

an open-faced second grooved channel having semi-circular second grooves and a second flange attached to said third outwardly facing surface of said second track; and, a second electro-mechanical actuator having a second bracket and a second electric motor with an attached second worm gear engaged with said second grooves, said second electro-mechanical actuator attached to said interior by said second bracket;

a second wheeled-rail assembly having a second rail with at least one spring loaded second wheel biased into contact with said fourth outwardly facing surface of said second framework to maintain engagement of said second grooves with said second worm gear;

wherein, when said first electric motor rotates, said first worm gear applies a force on said first grooves which moves said first track within said window opening; and, wherein, when said second electric motor rotates, said second worm gear applies a force on said second grooves which moves said second track within said window opening.

15. The vehicle according to claim 14, wherein said windowpane is configured to complement the door panel and to fit into a window opening.

16. The side window assembly according to claim 15, wherein said first framework has a first aperture that passes from said first outwardly facing surface to said second outwardly facing surface, wherein said first grooved channel has a matching second aperture, and wherein said first framework is attached to said first grooved channel by a first threaded fastener.

17. The vehicle according to claim 14, further including a control panel in said arm rest, said control panel in electrical communication with said first electric motor, with said second electric motor, and with said vehicle battery, wherein said control panel comprises a first switching assembly to activate said first electric motor in a first direction and in a second direction and a second switching assembly to activate said second electric motor in the first direction and in the second direction.

18. The side window assembly according to claim 17, wherein said control panel can activate said first electric motor and said second electric motor in different directions.

\* \* \* \* \*